United States Patent [19]

Tamai

[11] Patent Number: 5,557,192

[45] Date of Patent: Sep. 17, 1996

[54] CHARGING APPARATUS WITH A COMPENSATION CIRCUIT

[75] Inventor: Mikitaka Tamai, Sumoto, Japan

[73] Assignee: Sanyo Electric Co., Ltd., Osaka, Japan

[21] Appl. No.: 289,568

[22] Filed: Aug. 12, 1994

[30] Foreign Application Priority Data

Sep. 21, 1993 [JP] Japan ................... 5-234928

[51] Int. Cl.$^6$ .................................................. H02J 7/04
[52] U.S. Cl. ........................... 320/30; 320/39; 320/51
[58] Field of Search .............................. 320/23, 30, 31, 320/32, 39, 51, 53

[56] References Cited

U.S. PATENT DOCUMENTS 3,553,562  1/1971  Woods ........................... 320/39

5,442,274  8/1995  Tamai ........................... 320/23

FOREIGN PATENT DOCUMENTS 5-111184  4/1993  Japan .

*Primary Examiner*—Peter S. Wong
*Assistant Examiner*—Patrick B. Law
*Attorney, Agent, or Firm*—Wenderoth, Lind & Ponack

[57] ABSTRACT

The charging time for rechargeable batteries which require constant voltage charging is reduced by compensating for IR losses in the battery pack circuitry. A voltage detection circuit measures battery pack terminal voltage and a charging control circuit insures that battery voltage does not exceed a reference voltage. The system is improved by a compensation circuit which at least compensates for resistance in circuitry other than the rechargeable battery.

11 Claims, 6 Drawing Sheets

CHARGING APPARATUS WITH A COMPENSATION CIRCUIT

BACKGROUND OF THE INVENTION

This invention relates to a charging apparatus that charges a rechargeable battery at a constant voltage.

The lead storage battery, nickel cadmium battery, and other rechargeable batteries are well known for their ability to be charged repeatedly. In recent years, with the miniaturization and weight reduction of electronic equipment such as portable communication devices, notebook personal computers, and video cameras, the small but high capacity lithium-ion rechargeable battery has taken the limelight. As described in Japanese Patent Disclosure 5-111184, issued Apr. 30, 1993, the lithium-ion rechargeable battery is different from the constant current charged nickel cadmium battery in that it is charged with a constant voltage while limiting the charging current to a prescribed value.

FIG. 1 shows an embodiment of a prior art constant voltage charging circuit. This circuit charges a rechargeable battery B contained in a battery pack P. The battery pack P also contains a protection circuit S to prevent excessive charging or discharging of the rechargeable battery B.

This charging circuit is provided with a Direct Current (DC) power supply 1 for battery charging, a constant current control circuit 2 for controlling the charging current to the rechargeable battery B, and a constant voltage control circuit 3 for controlling tile charging voltage to keep the rechargeable battery B voltage from exceeding a prescribed value.

The constant current control circuit 2 is made up of two transistors TR1 and TR2, and two resistors R1 and R2. When the rechargeable battery B charging current increases, the voltage drop across R1 increases, increasing the base current in transistor TR2. Because of this, the emitter-collector resistance of TR2 drops, decreasing the base voltage of TR1. As a result, the emitter-collector resistance of TR1 increases, decreasing the charging current to the rechargeable battery B.

On the other hand, when the rechargeable battery B charging current decreases, the emitter-collector resistance of TR1 decreases, increasing the charging current to the battery B. In this fashion, the constant current control circuit 2 controls the rechargeable battery B charging current so as to be a fixed value (for example, 1C).

The constant voltage control circuit 3 is made up of a voltage detection circuit 4 connected between terminals A with the intention of measuring the voltage of the rechargeable battery B within the battery pack P, an operational amplifier (op-amp) S, a 4.2 V voltage reference device 6, and a diode 7. The op-amp 5 has its inverting input terminal connected to a voltage divider of the voltage detection circuit 4, its non-inverting input terminal connected to the voltage reference device 6, and its output terminal connected to the base of transistor TR1 through diode 7.

When the voltage measured between terminals A by the voltage detection circuit 4 is at or below the set voltage (4.2 V) of the voltage reference device 6, the output of the op-amp 5 is positive. Therefore, the diode 7 is reverse biased, and no current is pulled from the base of transistor TR1. Consequently, the constant current control circuit 2 charges the rechargeable battery without being affected by the constant voltage control circuit 3.

On the other hand, when tile voltage between terminals A reaches the set voltage of the voltage reference device 6, the output of the op-amp 5 goes to zero. This pulls current from the base of transistor TR1 into the op-amp 5, increasing the emitter-collector resistance of TR1, and reducing the charging current. In other words, charging is controlled such that the voltage between terminals A does not exceed the set voltage.

In this manner, under control of the constant current control circuit 2 and the constant voltage control circuit 3, the rechargeable battery B is charged by constant current and constant voltage as shown by the voltage-current (V-I) characteristics of FIG. 2.

In the above discussion, the rechargeable battery B voltage is taken to be the voltage measured by the voltage detection circuit 4 between terminals A. However, there is not only the rechargeable battery B between the terminals A-B, but there is also a resistive component due to the switching devices of the protection circuit S and connecting wires between A. The voltage drop due to this resistive component is included in the A terminal voltage. Consequently, the actual terminal voltage of the rechargeable battery B (namely, the voltage between terminals C-D in FIG. 1) is not constant but drops at high charging currents as shown in FIG. 3.

The resulting charging characteristics (namely, battery voltage V, charging current I, and charging capacity C) of the rechargeable battery B are shown by the solid lines of FIG. 4. Consequently, the actual battery charging time is longer than that expected by the charging characteristics (broken lines) corresponding to the V-I characteristics of FIG. 2.

It is thus the object of the present invention to provide a charging apparatus with a compensation circuit which reduces rechargeable battery charging time by compensating for the voltage drop due to the resistive component.

SUMMARY OF THE INVENTION

The charging apparatus with a compensation circuit of this invention is provided with a voltage detection circuit to measure voltage across the terminals of the circuitry which includes the rechargeable battery, and a charging control circuit to control battery charging, based on the voltage measured by the voltage detection circuit, such that the rechargeable battery voltage does not exceed a prescribed voltage. The charging apparatus with a compensation circuit is further provided with a compensation circuit to compensate the voltage measured by the voltage detection circuit for at least the voltage drop due to the resistive component in the circuitry other than the rechargeable battery.

The charging apparatus with a compensation circuit of this invention charges a battery while compensating the terminal voltage of the circuitry including the rechargeable battery, measured by the voltage detection circuit, for at least the voltage drop due to the resistive component in circuitry other than the rechargeable battery. As a result of this compensation, the charging control circuit controls charging based on the terminal voltage of the rechargeable battery only.

An embodiment of the charging apparatus with a compensation circuit of the present invention is provided with a voltage detection circuit to measure voltage across the terminals of the circuitry which includes the rechargeable battery, and a charging control circuit to control battery charging, based on the voltage measured by the voltage detection circuit, such that the rechargeable battery voltage does not exceed a prescribed voltage. The embodiment of the present invention is also provided with a compensation circuit to compensate the voltage measured by the voltage detection circuit for at least the voltage drop due to the resistive component in the circuitry other than the rechargeable battery. Therefore, the rechargeable battery voltage during constant voltage charging can be set to an appropriate value and the rechargeable battery can be rapidly charged.

DETAILED DESCRIPTION OF THE INVENTION

Figure 1:
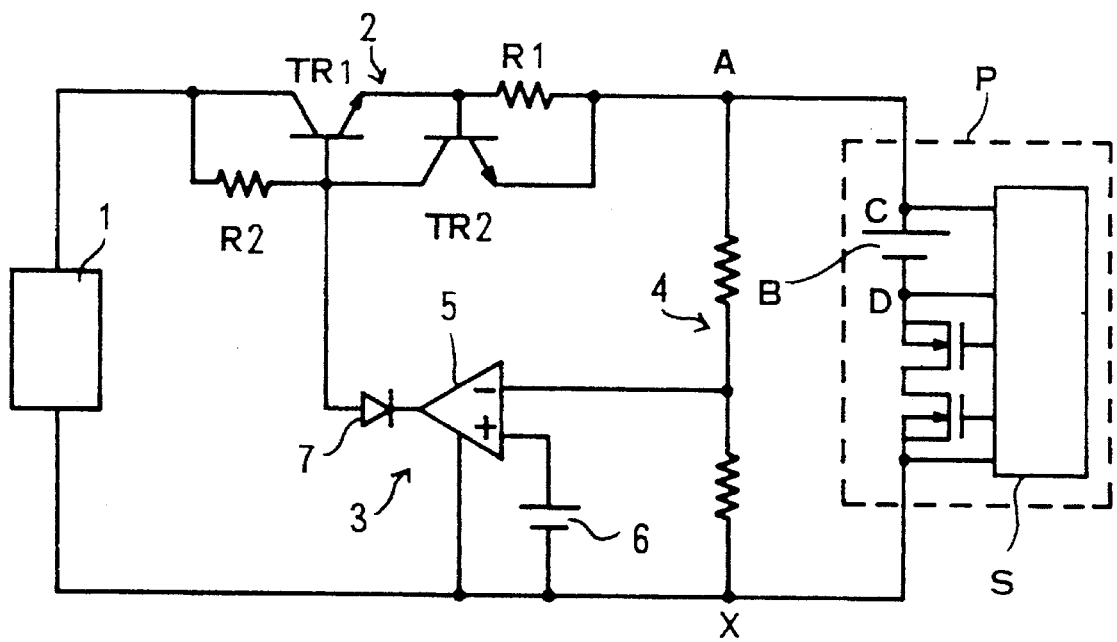
FIG. 1 is a circuit diagram showing a prior art charging circuit.
Figure 2:
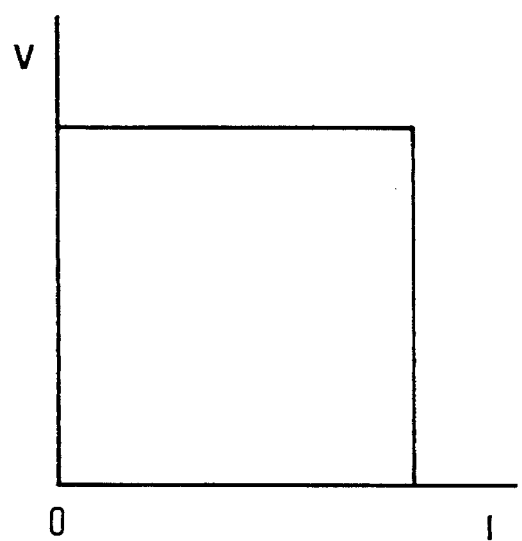
FIG. 2 is a graph showing voltage-current characteristics for a prior art charging circuit.
Figure 3:
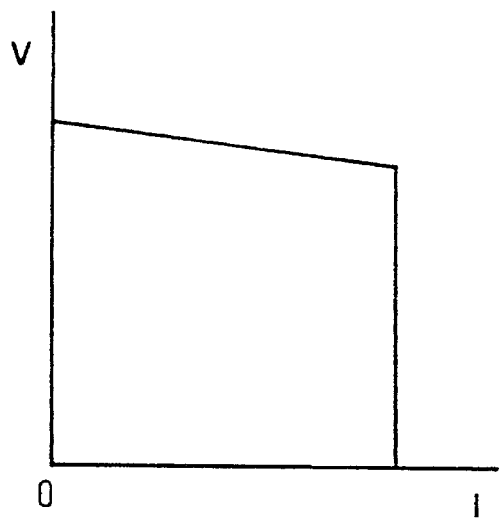
FIG. 3 is a graph showing voltage-current characteristics for a prior art charging circuit.
Figure 5:
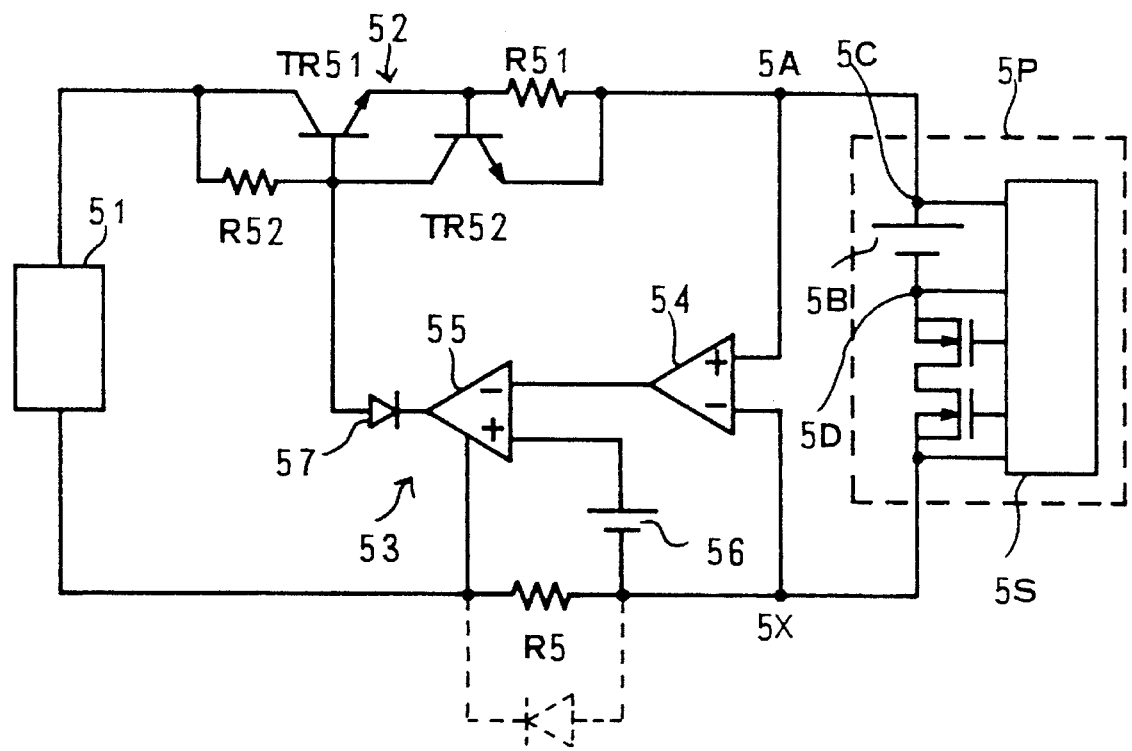
FIG. 5 is a circuit diagram showing an embodiment of the charging circuit of the present invention.

Turning to FIG. 5, the circuit diagram of an embodiment of the present invention is shown. In FIG. 5, a compensation resistor R5 is connected to the negative terminal of the reference voltage device 56. The value of this compensation resistor R5 is equal to the resistive component between the terminals 5A–5 excluding that of the rechargeable battery 5B between the terminals 5C–5D. In other words, the value of R5 is set equal to the total resistance of the switching devices of the protection circuit 5S, the resistive component due to connecting wires, and the contact resistance of the battery pack 5P with the charging circuit. Further, a gain of one difference amplifier is used as the voltage detection circuit 4. Since the rest of the circuit is the same as that of FIG. 1, part numbers have the same lowest order digit and their description is not repeated.

Figure 4:
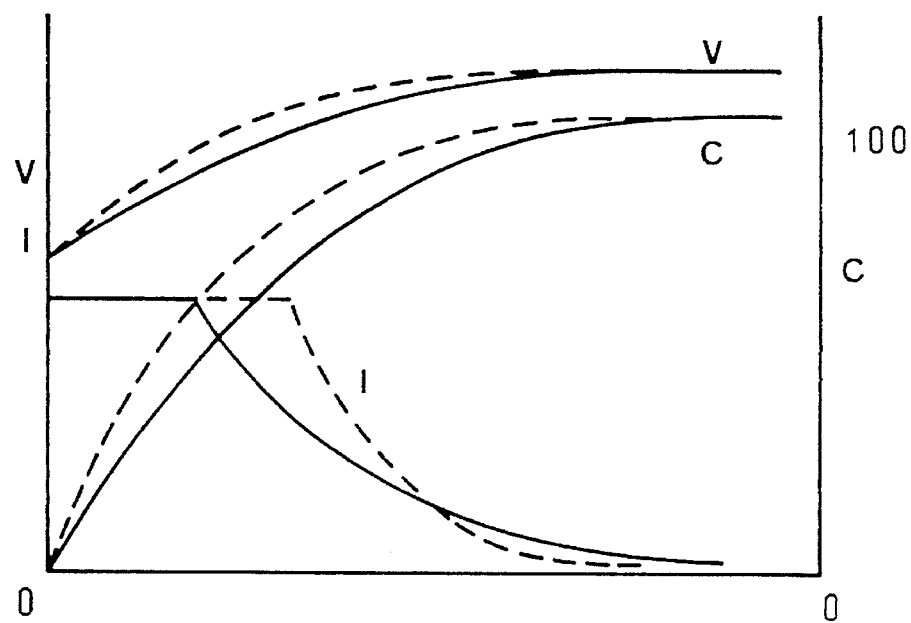
FIG. 4 is a graph showing prior art charging characteristics.
Figure 6:
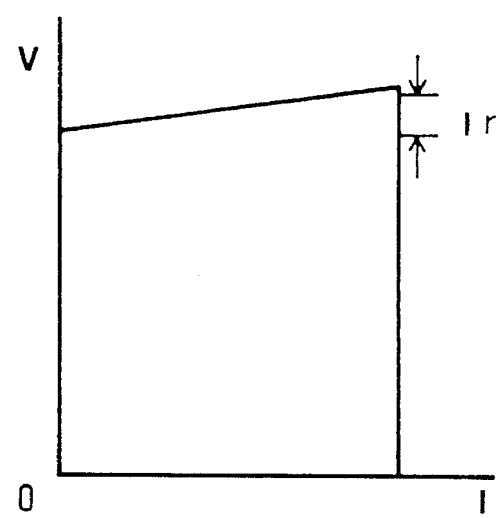
FIG. 6 is a graph showing voltage-current characteristics for the charging circuit of the present invention.
Figure 7:
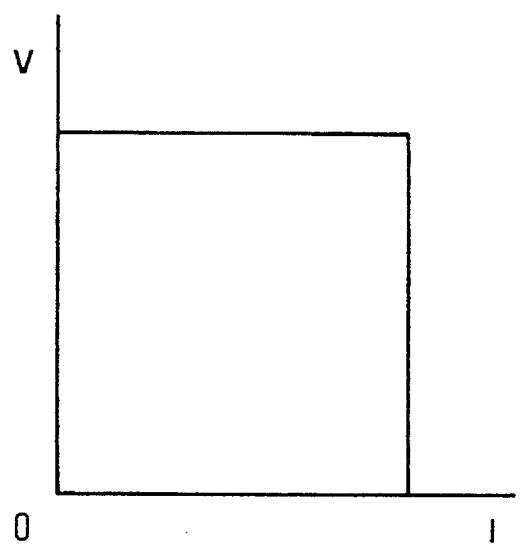
FIG. 7 is a graph showing voltage-current characteristics for the charging circuit of the present invention.

In this circuit configuration, if the charging current is I and the resistance of the compensation resistor R5 is r, then the voltage at the non-inverting input of the op-amp 55 is the voltage drop Ir across the compensation resistor R5 added to the 4.2 V set by the reference voltage device (4.2 V+Ir). Consequently, the terminal voltage 5A–5B is controlled as shown in FIG. 6 such that the voltage increases linearly with charging current. As a result, the rechargeable battery 5B terminal voltage 5C–5D becomes constant as shown in FIG. 7, the rechargeable battery 5B charging characteristics become those shown by the broken lines in FIG. 4, and the charging time is not lengthened.

Figure 8:
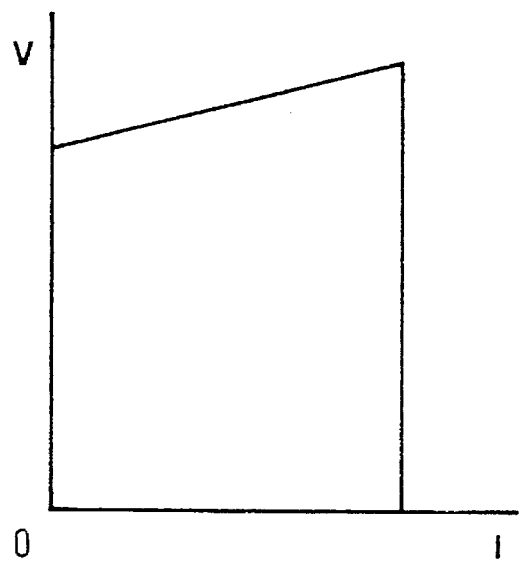
FIG. 8 is a graph showing is voltage-current characteristics for another embodiment of the present invention.
Figure 9:
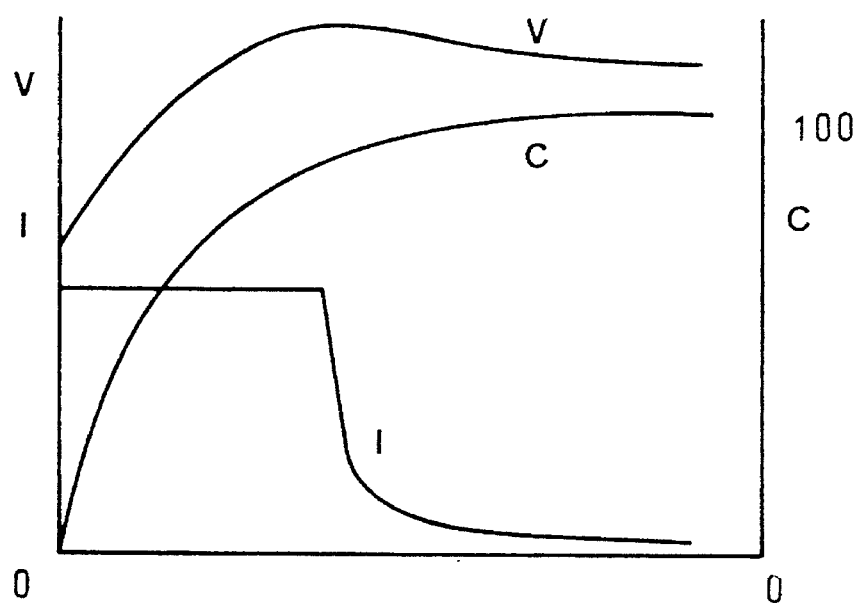
FIG. 9 is a graph showing charging characteristics for another embodiment of the present invention.

If the value r of the compensation resistor R5 is made greater than the total resistance of the switching devices of the protection circuit 5S, the resistive component due to connecting wires, and the contact resistance of the battery pack 5P with the charging circuit, terminal voltage 5C–5D characteristics such as those shown in FIG. 8 are obtained. As shown in FIG. 8, at large charging currents the charging voltage can be made larger than the set 4.2 V, for example 4.3 V. By increasing r, a higher level of rapid charging is possible, as shown in FIG. 9.

In this case, the rechargeable battery is charged at a voltage exceeding the prescribed voltage (4.2 V) and there is a danger of degrading the battery due to over-charging. Therefore, it is recommended that tile rechargeable battery be protected from over-charging degradation by a series connected discharge resistor and switch connected in parallel with the battery pack such that the switch is turned on only during battery charging.

Figure 10:
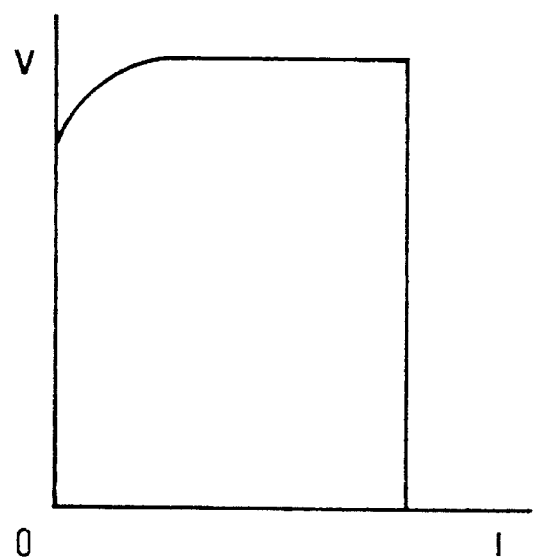
FIG. 10 is a graph showing voltage-current characteristics for still another embodiment of the present invention.

In the previous embodiment, the voltage drop due to the resistance of the protection circuit 5S switching devices, the resistive component due to connecting wires, and the contact resistance of the battery pack 5P with the charging circuit was compensated by the resistor RS. However, compensation is not limited to the use of a resistor, and a diode may be used. In the case of a diode, the terminal voltage 5C–5D characteristics change to the curve shown in FIG. 10. Furthermore, a suitable combination of diodes and resistors may also be used for compensation.

Figure 11:
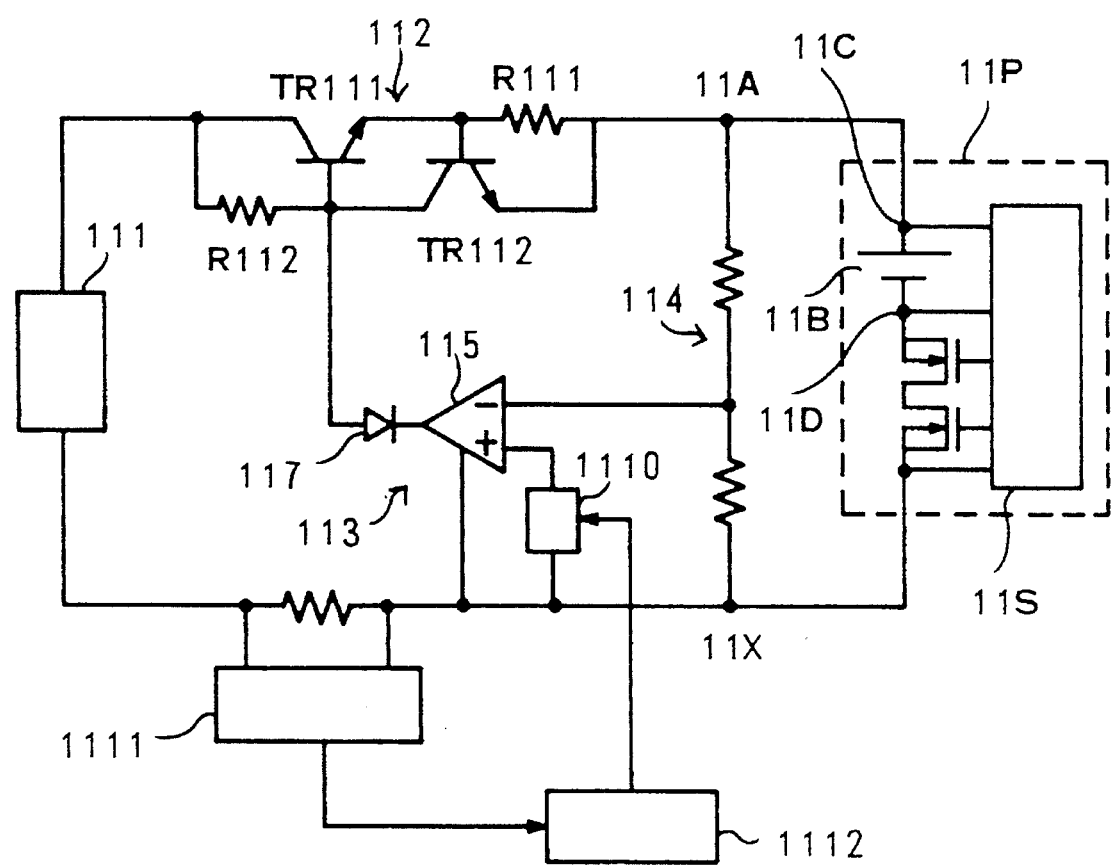
FIG. 11 is a circuit diagram showing still another embodiment of the charging circuit of the present invention.

Finally turning to FIG. 11, the circuit diagram of another embodiment of the present invention is shown. In this embodiment, a Digital to Analog (D/A) converter 1110 is used to replace the reference voltage device 56 and compensation resistor R5 of Fig. S. The output voltage Vx of the A/D converter 1110 is controlled by a computation circuit 1112 based on the results of charging current measurements made by a current detection circuit 1111. The computation circuit 1112 controls the output voltage Vx of the D/A converter 1110 such that the terminal voltage 11C–11D decreases with decreasing charging current according to a function Vx=f(I). This function can be a second order function, a third order function, or a piecewise continuous step function.

In this case, as in the previous embodiment, the rechargeable battery 11B can be rapidly charged.

What is claimed is:

1. A charging apparatus with a compensation circuit comprising:

(a) a voltage detection circuit for measuring the voltage across terminals of circuitry including a rechargeable battery;

(b) a charging control circuit for controlling charging, based on the voltage measured by the voltage detection circuit, such that the rechargeable battery voltage does not exceed a prescribed voltage; and (c) a compensation circuit for at least compensating the voltage measured by the voltage detection circuit for a voltage drop due to a resistive component in circuitry other than the rechargeable battery;
 wherein the voltage detection circuit is provided with a reference voltage device and an op-amp having a first and a second input terminal;
 wherein the terminal voltage of circuit including the rechargeable battery is input to the first input terminal of the op-amp and the reference voltage is input to the second input terminal of the op-amp for comparison;
 wherein the compensation circuit is provided with a compensation resistor connected in series with the rechargeable battery, and wherein the compensation resistor is connected to the reference voltage device such that the voltage drop across the compensation resistor is added to the voltage of the reference voltage device and input to the second input terminal of the op-amp.

2. A charging apparatus with a compensation circuit as recited in claim 1, wherein the resistance of the compensation resistor is equal to the resistive component of circuitry other than the rechargeable battery.

3. A charging apparatus with a compensation circuit as recited in claim 1, wherein tile resistance of the compensation resistor is greater than the resistive component of circuitry other than the rechargeable battery.

4. A charging apparatus with a compensation circuit as recited in claim 1, wherein the voltage detection circuit is provided with a difference amplifier, the terminal voltage of circuitry including the rechargeable battery is input to the first input terminal of the op-amp through the difference amplifier, and the voltage across the compensation resistor and the voltage reference device are added and input to the second input terminal of the op-amp.

5. A charging apparatus with a compensation circuit comprising:
(a) a voltage detection circuit for measuring the voltage across terminals of circuitry including a rechargeable battery;
(b) a charging control circuit for controlling charging, based on the voltage measured by the voltage detection circuit, such that the rechargeable battery voltage does not exceed a prescribed voltage; and
(c) a compensation circuit for at least compensating the voltage measured by the voltage detection circuit for a voltage drop due to a resistive component in circuitry other than the rechargeable battery;
wherein the voltage detection circuit is provided with a reference voltage device and an op-amp having a first and a second input terminal;
wherein the terminal voltage of circuit including the rechargeable battery is input to the first input terminal of the op-amp and the reference voltage is input to the second input terminal of the op-amp for comparison;
wherein the compensation circuit is provided with a current detection circuit for measuring charging current and a computation circuit for computing rechargeable battery charging voltage based on measurement by the current detection circuit and the reference voltage device is a D/A converter for converting computation circuit output to an analog value, and wherein the D/A converter is connected to the second input terminal of the op-amp and the op-amp compares the output voltage of the D/A converter with the terminal voltage of circuitry including the rechargeable battery.

6. A charging apparatus with a compensation circuit as recited in claim 5, wherein the computation circuit computes the D/A converter output voltage Vx to be a function of the rechargeable battery charging current I such that the D/A converter output voltage function Vx=f(I) decreases with decreasing charging current.

7. A charging apparatus with a compensation circuit as recited in claim 6, wherein Vx=f(I) is a second order quadratic function.

8. A charging apparatus with a compensation circuit as recited in claim 6, wherein Vx=f(I) is a third order cubic function.

9. A charging apparatus with a compensation circuit comprising:
(a) a voltage detection circuit for measuring the voltage across terminals of circuitry including a rechargeable battery;
(b) a charging control circuit for controlling charging, based on the voltage measured by the voltage detection circuit, such that the rechargeable battery voltage does not exceed a prescribed voltage; and
(c) a compensation circuit for at least compensating the voltage measured by the voltage detection circuit for a voltage drop due to a resistive component in circuitry other than the rechargeable battery;
wherein the voltage detection circuit is provided with a reference voltage device and an op-amp having a first and a second input terminal;
wherein the terminal voltage of circuit including the rechargeable battery is input to the first input terminal of the op-amp and the reference voltage is input to the second input terminal of the op-amp for comparison;
wherein the compensation circuit is provided with a diode connected in series with the rechargeable battery, and wherein the diode is connected to the reference voltage device such that the voltage drop across the diode is added to the voltage of the reference voltage device and input to the second input terminal of the op-amp.

10. A charging apparatus having a compensation circuit comprising:
(a) a voltage detection circuit for measuring the voltage across terminals of circuitry including a resistive component and a rechargeable battery;
(b) a charging control circuit for controlling charging, based on the voltage measured by the voltage detection circuit, such that the rechargeable battery voltage does not exceed a prescribed voltage; and
(c) a compensation circuit for generating a compensation voltage which is substantially proportional to a charging current flowing in the circuitry including the rechargeable battery and resistive component and which is fed to the charging control circuit so as to at least compensate the voltage measured by the voltage detection circuit for a voltage drop due to the resistive component in circuitry other than the rechargeable battery, thereby increasing the charging speed of the rechargeable battery.

11. A charging apparatus with a compensation circuit as recited in claim 10, wherein the voltage detection circuit is provided with a reference voltage device and an op-amp having a first and a second input terminal, and wherein the terminal voltage of circuitry including the rechargeable battery is input to the first input terminal for the op-amp and the reference voltage is input to the second input terminal of the op-amp for comparison.

* * * * *